United States Patent [19]

Minagawa et al.

[11] 4,224,203

[45] Sep. 23, 1980

[54] VINYL CHLORIDE POLYMER STABILIZER COMPRISING A METAL ORGANOPHOSPHONATE

[75] Inventors: Motonobu Minagawa, Koshigaya; Tetsuo Sekiguchi, Hasuda; Naoyasu Kurita, Urawa; Yuji Sugawara, Koshigaya, all of Japan

[73] Assignee: Argus Chemical Corporation, Brooklyn, N.Y.

[21] Appl. No.: 939,324

[22] Filed: Sep. 5, 1978

[51] Int. Cl.$^2$ .................... C08K 5/09; C08K 5/13; C08K 5/53

[52] U.S. Cl. .................... 260/23 XA; 252/400 A; 252/400 R; 260/45.7 P; 260/45.7 PH; 260/45.7 R; 260/45.75 B; 260/45.75 N; 260/45.75 R; 260/45.75 W; 260/45.8 A; 260/45.85 A; 260/45.85 R; 260/45.85 S; 260/45.9 NC; 260/45.95 J; 260/45.95 L; 260/45.95 R; 260/45.95 S

[58] Field of Search .................... 260/45.7 PT, 45.95 J

[56] References Cited

U.S. PATENT DOCUMENTS

| 2,564,646 | 8/1951 | Leistner et al. | 260/45.7 PH |
|---|---|---|---|
| 2,716,092 | 8/1955 | Leistner et al. | 260/45.95 J |
| 2,934,507 | 4/1960 | Chadwick et al. | 260/45.7 PT |
| 2,952,658 | 9/1960 | Pfeifer et al. | 260/45.7 PT |
| 2,959,568 | 11/1960 | Havens | 260/45.7 PT |
| 3,054,771 | 9/1962 | Hiestand et al. | 260/23 XA |
| 3,127,366 | 3/1964 | Zaremsky | 260/23 XA |
| 3,144,422 | 8/1964 | Homberg | 260/23 H |
| 3,223,660 | 12/1965 | Pulver et al. | 260/23 XA |
| 3,235,521 | 2/1966 | Pitrot et al. | 260/23 XA |
| 3,310,575 | 3/1967 | Spivack | 260/45.7 PT |
| 3,453,225 | 7/1969 | Pollock | 260/45.75 W |
| 3,767,735 | 10/1973 | Fenyes et al. | 260/45.7 PT |
| 3,833,519 | 9/1974 | Ejk et al. | 260/45.95 J |
| 3,894,986 | 7/1975 | Racky et al. | 260/45.7 PT |

*Primary Examiner*—Hosea E. Taylor
*Assistant Examiner*—R. A. White
*Attorney, Agent, or Firm*—Otto S. Kauder

[57] ABSTRACT

A stabilizer composition is disclosed that enhances the resistance to deterioration upon heating of vinyl chloride polymers. The stabilizer composition comprises (A) a metal salt of a sulfur—and nitrogen—free monocarboxylic acid or a phenol and (B) a metal P-hydrocarbonphosphonate having at least one to thirty carbon atoms in the hydrocarbon group.

Vinyl chloride polymer compositions stabilized with the above disclosed stabilizer composition are also disclosed.

15 Claims, No Drawings

VINYL CHLORIDE POLYMER STABILIZER COMPRISING A METAL ORGANOPHOSPHONATE

BACKGROUND OF THE INVENTION

This invention relates to a new stabilizer composition for enhancing the resistance to deterioration upon heating of vinyl chloride polymers, and to vinyl chloride polymers having enhanced resistance to deterioration in initial color, heat stability and clarity as a result of incorporating therein a stabilizer composition according to this invention.

There is a voluminous literature on the stabilization of vinyl chloride polymers. Patent disclosures of materials stated to be useful in minimizing deterioration of vinyl chloride polymers on heating number well over one thousand. Among the more important heat stabilizers in commercial use are mild alkalis such as sodium carbonate, disodium phosphate, and sodium and potassium salts of partially esterified phosphoric acids; carboxylates and phenolates of zinc, cadmium, and the alkaline earth metals; inorganic and organic lead salts; organotin carboxylates, as disclosed by Quattlebaum in U.S. Pat. No. 2,307,157; organotin mercaptides as disclosed by Leistner in U.S. Pat. Nos. 2,641,588 and 2,641,598; various metal-free organic compounds such as the polyols, e.g. mannitol, sorbitol, glycerol, pentaerythritol, organic phosphites, 1,2-epoxides, e.g., soybean oil epoxide, isooctyl epoxy-stearate, and the diglycidyl ether of 2,2-bis(p-hydroxyphenyl) propane, and nitrogen compounds, e.g., phenylurea, N,N'-diphenylthiourea, and 2-phenylindole. For detailed discussion of heat stabilizers for vinyl halide resins, reference may be made to the articles, L. I. Nass, in "Encyclopedia of Polymer Science and Technology" (N. Bikales, ed.) Vol. 12 pages 737 to 768 (1970); N. L. Perry "Barium-Cadmium Stabilization of Polyvinyl Chloride," *Rubber Age* 85 449–452 (June, 1959), and by H. Verity-Smith, *British Plastics* 27 176–179, 213–217, 307–311 (1954); the brochure by the same author *The Development of the Organotin Stabilizer* (Tin Research Institute, 1959) and the book *La Stabilisation des Chlorures de Polyvinyle* by F. Chevassus (Amphora, Paris, 1957).

There have also been disclosures of the effectiveness of certain phosphorus compounds having organic groups directly linked to phosphorus in stabilizing organic materials subject to various deteriorating influences. E. K. Bolton in U.S. Pat. No. 2,230,371 of Feb. 4, 1941 disclosed the incorporation in organic substances subject to oxidative decomposition catalyzed by copper and its compounds of small amounts of a phosphorus compound of the class of organic monophosphonic acids and organic dihydroxyphosphines, that is compounds having the organic radical directly attached to phosphorus and having two hydrogens replaceable by metal. In a direct comparison of an organic monophosphonic acid and its dodecyl ester (having only one replaceable hydrogen) in a gasoline oxidation induction period test, only the former compound was effective, thus demonstrating the critical requirement of two replaceable acidic hydrogen atoms in the molecule.

G. Denison Jr., in U.S. Pat. No. 2,346,155 of Apr. 11, 1944 disclosed a hydrocarbon oil containing a combination of stabilizing agents, comprising a thioether or seleno ether and an oxide, sulfide, or selenide having directly connected to an oxygen, sulfur or selenium atom both a metal in a basic form and an acid-forming element such as those of Periodic groups IIIA, IV, VB, and VIB. Denison's disclosure encompasses untold thousands of compounds in over 150 classe, of which 28 are classes of phoshorus compounds among which phosphonic acids and phosphonic acid monoesters are mentioned in the form of metal salts.

C. B. Havens in U.S. Pat. No. 2,959,568 of Nov. 8, 1960 disclosed haloethylen polymers stabilized with an inorganic salt of phenyl-phosphonic acid. In an example, an 85–15 copolymer of vinylidene chloride and vinyl chloride was heated at 178° C. until the pressure of evolved hydrohalide gas evidenced thermal degradation. Nothing is disclosed about the effect if any on initial color or eventual color changes of any of Havens' phenylphosphonates. W. Leistner in U.S. Pat. No. 2,997,454 of Aug. 22, 1961 disclosed polyvinyl chloride compositions of excellent initial color stabilized with a combination of an organic triphosphite with a heavy metal fatty acid salt to which there is added a phosphorus compound having at least one hydrogen atom of acidic character. The phosphorus acids in Leistner's compositions are defined by the formula

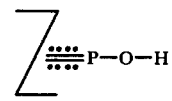

In this formula, phosphorus has a valence of three or five, the additional two valences being indicated by dotted line bonds. Typical phosphorus acids coming within this general formula are the following:

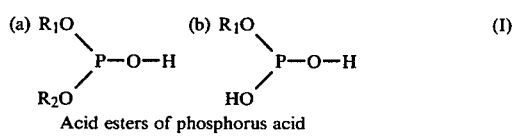

Acid esters of phosphorus acid

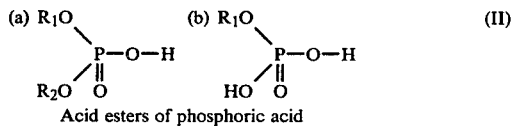

Acid esters of phosphoric acid

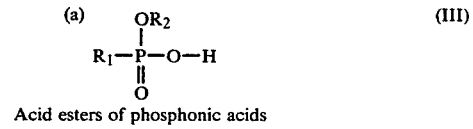

Acid esters of phosphonic acids

Phosphonic acids

Phosphinic acids

Phosphorus acid

-continued

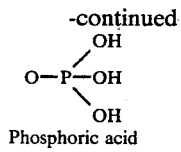
Phosphoric acid (VI)

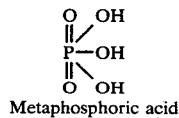
Metaphosphoric acid (VII)

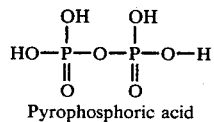
Pyrophosphoric acid (VIII)

In the above formulae $R_1$ and $R_2$ represent an organic aliphatic, aromatic or nonaromatic alicyclic hydrocarbonor heterocyclic radical having from one to about thirty carbon atoms. $R_1$ and $R_2$ in I, II, III(a) and IV may be the same or different.

R. Harrington, Jr. in U.S. Pat. No. 3,274,014 of Sept. 20, 1966 disclosed yarn compositions of synthetic fibers having incorporated a small amount of a metal monoalkyl or monoaryl phosphate, metal dialkyl phosphate, metal alkyl phosphonate, metal alkyl (alkyl phosphonate) or metal dialkyl phosphite that are resistant to ultraviolet light. Examples show among others yarns spun from dopes of modified vinylidene chloride-acrylonitrile copolymer containing either zinc (ethyl phosphonate) or zinc bis(ethyl(ethyl phosphonate)).

J. Spivack in U.S. Pat. No. 3,310,575 of Mar. 21, 1967 disclosed metal derivatives of monobasic and dibasic hindered phenol substituted phosphonic acids that have thermal stabilizing properties for polymeric substances as well as rendering the polymeric substance more amenable to dyeing and reducing the tendency of the polymeric substance to discolor upon exposure to light, whether dyed or not. Spivack's phosphonate derivatives are characterized by the formula:

$[P]_m M_x [G]_p$ wherein
M is a metal having an available valence of from 1 to 4;
G is an anion having an available valence of from 1 to 3; and
P is of the formula:

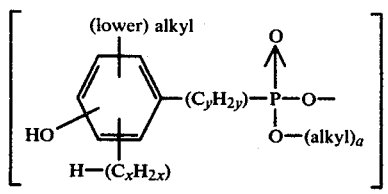

and wherein
z has a value of from 0 to 6,
y has a value of from 1 to 4,
n has a value of from 0 to 1.
m has a value of from 1 to 3,
x has a value of from 1 to 2, and
p has a value of from 0 to 3, n,m,p and x being so selected as to satisfy the expression $$\frac{(2-n)m}{x} + \frac{(r)p}{x} = \text{available valence of } M$$

wherein r is the valence of anion G and has a value of from 1 to 3.

The group M consists either of a metal in full free valence state such as sodium, cadmium, zinc, barium, nickel, aluminum, tin, chromium, cobalt, iron, copper, titanium, vanadium, and the like, or of a metal derivative in which part but not all of its full free valence state is satisfied by alkyl substitution, e.g. dialkltin. Preferably M is a metal in its full free valence state, particularly those having a valence of 2 to 4 such as cadmium, zinc, barium, nickel, iron, copper, aluminum, tin, chromium, titanium, vanadium, and cobalt. Of these, aluminum and the transitional metals, particularly nickel, are especially useful.

The available valence bonds of the metal will be satisfied by one or more phosphonate or O-alkyl phosphonate groups and, if needed, by anions, organic or inorganic. Thus when n=0, there may be one (m=1) or more (m=2 or 3) phosphonate groups. Likewise there may be one or more O-alkyl phosphonate groups (n=1). In some instances, as in the case of aluminum or chrominum, three phosphonate groups combined with two metal atoms (x=2) to satisfy the valence requirements. In the case of mixed salts, one, two or three monovalent anions will make up the valence requirements. In all instances, the compounds will contain at least one phosphonate group or at least one O-alkyl phosphonate group and the values of n,m,p and x is such that the following expression is satisfied:

$$\frac{(2-n)m}{x} + \frac{(r)p}{x} = \text{available valence of } M$$

wherein r is the valence of anion G and has a value of from 1 to 3.

The anion G may be organic or inorganic. Illustrative of such organic anions are carboxylate, such as those derived from carboxylic acids containing from 1 to 30 carbon atoms, preferably 2 to 18 carbon atoms, e.g. acetate, laurate, stearate, benzoate, malonate, maleate, succinate, and the like; phenates and alkyl substituted phenates; alkyl- and aryl-sulfates and -sulfonates; alkyl- and arylphosphates and -phosphonates; and inorganic anions such as chloride, bromide, iodide, fluoride, nitrate, cyanide, cyanate, thiocyanate, sulfate, and the like.

A. DiBattista in U.S. Pat. No. 3,824,192 disclosed as part of a multicomponent stabilizer system containing a phenolic antioxidant, a sulfur compound synergist, an ultraviolet light absorber, and a benzoate type co-light stabilizer, an organophosphorometal compound that is either Spivack's above hindered phenol substituted metal phosphonate derivative or a metal and metal complex salt of a hindered phenolic alkylphosphinic acid represented by the formula

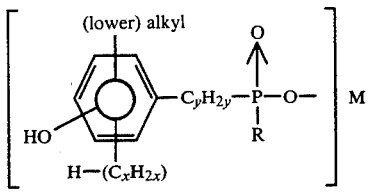

wherein
M is a metal or metal complex cation, this cation having an available valence of from 1 to 4;
z has a value of from 0 to 6;
v has a value of from 1 to 4; and
y has a value of from 1 to 4, the value of v being the same as the available valence of M.

Disclosures are also acknowledged of stabilizer compositions including metal derivatives of organic phosphorus compounds having no direct carbon to phosphorus linkage. P. Klemchuk in U.S. Pat. No. 3,219,605 of Nov. 23, 1965 disclosed that cadmium, barium, calcium, or zinc salts of monoalkyl phosphites are remarkably effective light stabilizers for polyvinyl chloride compositions, alone or in combination with other light and/or thermal stabilizers. The metal salts are defined by the formula

 (I)

wherein
R is an alkyl radical, e.g. alkyl having from 1 to 30 carbon atoms, preferably having from 1 to 12 carbon atoms, and
M is a divalent metal which may be cadmium, barium, calcium or zinc.

Farbwerke Hoeschst in French Pat. No. 1,412,321 of Aug. 16, 1965 disclosed the stabilization against light of polyvinyl chloride with 0.1 to 5% by weight of nickel organic phosphites containing only nickel, phosphorus, carbon, hydrogen and oxygen, along with barium-cadmium soaps, organic phosphite, epoxy compounds, and optionally ultraviolet absorbers.

T. Kamijo in U.S. Pat. No. 3,312,658 of Apr. 4, 1967 disclosed a stabilizer combination of alkyl-substituted phenolic antioxidant with a synergistic agent which is a nickel salt of a monoester or diester of phosphoric acid, represented by one or both of the formulas:

where the R radicals are selected from the group consisting of alkyl, aryl, alkaryl and cycloalkyl radicals.

SUMMARY OF THE INVENTION

In accordance with this invention, a stabilizer composition capable of enhancing the resistance to deterioration of a vinyl chloride polymer in initial color, clarity, and heat stability upon heating at 175° C. comprises (A) at least one metal salt of a nitrogen- and sulfur-free monocarboxylic acid having 6 to 24 carbon atoms or a phenol having 6 to 30 carbon atoms, and (B) at least one metal P-hydrocarbonphosphonate having directly linked to phosphorus one aromatic, aliphatic, or cycloaliphatic hydrocarbon group having 1 to 30 carbon atoms, and three oxygen atoms of which at least one and not more than two are linked to metal. For each 100 parts of vinyl chloride polymer being stabilized, the quantity of stabilizer composition used suitably provides 0.01 to 5 parts by weight of the metal carboxylic acid salt and 0.01 to 5 parts of the metal P-hydrocarbonphosphonate. The ratio of metal carboxylic acid salt to metal P-hydrocarbonphosphonate in the stabilizer composition is preferably within the range from 5:1 to 1:5.

The metal P-hydrocarbonphosphonate can be represented by the formula:

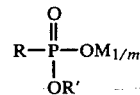

in which R is an aromatic group having 6 to 30 carbon atoms, an aliphatic group having 1 to 30 carbon atoms, or a cycloaliphatic group having 5 to 30 carbon atoms, M is a metal having a valence of m, R' is a group R or a metal equivalent unit $M_{1/m}$ and m is an integer from 1 to 4. M can be a metal of Group I of the Periodic Table having a atomic weight less than 50, such as potassium, sodium, lithium; a metal of Group II having an atomic weight between 20 and 150, such as barium, cadmium, strontium, zinc, calcium, and magnesium; a metal of Group IV having an atomic weight between 90 and 220, such as zirconium, tin, and lead; and antimony, and tin substituted with two alkyl groups having from 1 to 12 carbon atoms, and nickel.

The metal in the metal salt of a carboxylic acid is selected from among the metals M and can be the same or different from the metal in the metal P-hydrocarbonphosphonate.

DESCRIPTION OF PREFERRED EMBODIMENTS

The metal salt component of the stabilizer component is preferably a salt of a bivalent metal, such as barium, cadmium, nickel, lead, calcium, magnesium, strontium, stannous tin, and zinc. Four-valent tin with two of the four valences linked through carbon to alkyl groups, i.e. dialkyltin salts such as dimethyltin, di-n-butyltin, di-isobutyltin, di-2-ethylhexyltin and di-n-octyltin carboxylates and substituted phenolates, are also among the preferred metal salts in the stabilizer composition according to this invention. In the salt, the acid may be any mono-carboxylic acid free of nitrogen and sulfur having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with non-reactive groups, such as halogen, and hydroxyl. By the term "alicyclic" it will be understood that there is intended any cyclic acid in which the ring is non-aromatic and composed solely of carbon atoms, and such acids may if desired have inert, non-reactive substituents such as halogen, hydroxyl, alkyl radicals, alkenyl radicals and other carbocyclic ring structures condensed therewith. The oxygen containing heterocyclic compounds can be aromatic or non aromatic and can include oxygen and carbon in the ring structure, such as alkyl substituted furoic acid. The aromatic acids likewise can have non-reactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, sorbic acid, n-octoic acid, isooctoic acid, 3,5,5-trimethyl hexoic acid, pelargonic acid, capric acid, neodecanoic acid, undecylenic acid, lauric acid, myristic acid, isodecanoic acid, palmitic acid, isostearic acid, stearic acid, oleic acid, ricinoleic acid, erucic acid, behenic acid, chlorocaproic acid, 12-hydroxy stearic acid, 12-ketostearic acid, phenyl stearic acid, benzoic acid, phenylacetic acid, p-t-butylbenzoic acid, ethylbenzoic acid, isopropylbenzoic acid, bromobenzoic acid, salicylic acid, naphthoic acid, 1-naphthaleneacetic acid, orthobenzoyl benzoic acid, 5-t-octylsalicyclic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

In combination with the above metal salts of organic acids, or in lieu thereof, a metal salt of an optionally hydrocarbonsubstituted phenol can be used. The hydrocarbon substituents contain from one to twenty-four carbon atoms each. The metal can be an alkali metal or alkaline earth metal such as sodium, potassium, lithium, calcium, strontium, magnesium, and barium. Among such polyvalent metal phenolates there can be mentioned the magnesium, barium, calcium, strontium, tin and zinc salts of phenol, ethylphenol, cresol, xylenol, butyl phenol, isoamyl phenol, isooctyl phenol, 2-ethylhexyl phenol, t-nonylphenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, ortho or para phenyl phenol. The metal phenolate should be compatible with the halogen-containing resin.

Mixtures of salts of various metals can be used, and many such mixtures are known to give enhanced effects, such as mixed zinc and tin salts with the alkaline earth metal salts, e.g., barium and zinc stearates, as in U.S. Pat. No. 2,446,976.

In the metal P-hydrocarbon phosphonate according to this invention, aromatic R groups include phenyl and preferably groups having 7 or more carbon atoms such as 1-naphthyl, 2-naphthyl, tolyl, xylyl, ethylphenyl, butylphenyl, t-butylphenyl, octylphenyl, isooctylphenyl, nonylphenyl, 2,4-di-t-butylphenyl, p-dodecylphenyl, didodecylphenyl, cyclohexylphenyl, dicyclohexylphenyl, benzyl, 1-phenylethyl, 2-phenylethyl, 3-phenylpropyl, 7-phenylheptyl, p-ethoxybenzyl, 2,4-dichlorobenzyl, p-pentadecylbenzyl, and trimethylbenzyl.

Aliphatic R groups include methyl, ethyl, propyl, isopropyl, butyl, isobutyl, t-butyl, s-butyl, amyl, neopentyl, isoamyl, hexyl, decyl, isodecyl, lauryl, tridecyl, $C_{12-15}$ mixed alkyl, stearyl, eicosyl, docosyl, triacontanyl, allyl, methallyl, oleyl, 2-hydroxyethyl, 12-hydroxyoctadecyl, and ether substituted groups such as 2-methoxyethyl, 2-ethoxyethyl, 2-isopropoxyethyl, 2-butoxyethyl, 2-isobutoxyethyl, 2-hexyloxyethyl, 2-cyclohexyloxyethyl, 2-phenoxyethyl, 2(2'-methoxyethoxy)ethyl, 2(2'-ethoxyethoxy)ethyl, 2(2'-isopropoxyethoxy)ethyl, 2(2'-butoxyethoxy)ethyl, 2(2'-butoxyethoxy)ethyl, 2(2'-isobutoxyethoxy)ethyl, and residue of triethylene glycol monoethylether, -monobutylether, or residue of glycerin-1,2-dimethyl ether, -1,3-dimethylether, -1,3-diethylether, -1-ethyl-2-propylether, or nonylphenoxypolyethoxyethyl, and lauroxypolyethoxyethyl.

Cycloaliphatic groups include cyclopentyl, cyclohexyl, methylcyclopentyl, dimethylcycobutyl, 4-methylcyclohexyl, 4-t-butyl-cyclohexyl, cyclooctyl, cyclododecyl, 1,2,3,4-tetrahydro-2-naphthyl, decahydro-1-naphthyl, hydrodicyclopentadienyl, cholesteryl, and dehydroabietyl.

When the metal P-hydrocarbonphosphonate is of a one-valent metal, such as potassium, and R' is an R group, such as butyl, the phosphonate is an ester-salt having one metal atom per P-hydrocarbonphosphonate group. Such a compound, for which m=1, can be represented by the formula

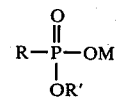

and exemplified by potassium butyl P-butanephosphonate in which R and R' are butyl and M is potassium. When R' is also a one-valent metal, the phosphonate is a salt having two metal atoms per P-hydrocarbonphosphonate group, exemplified by dipotassium butanephosphonate in which R is butyl and both R' and M are potassium.

When the metal P-hydrocarbonphosphonate is of a two-valent metal, such as magnesium, and R' is an R group, such as butyl, the phosphonate is an ester salt having usually two P-hydrocarbonphosphonate groups per metal atom. Such a compound, for which m=2, can be represented by the formula

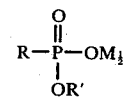

or more fully

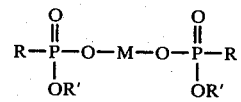

and exemplified by magnesium di(butyl P-butanephosphonate). Two-valent metals having a strong tendency to form basic salts, such as lead and dialkyltin, also furnish ester salts having two P-hydrocarbonphosphonate groups for two or more metal atoms.

To include such basic salts, the preceding formula can be written as

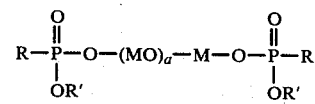

in which a is zero or an integer from 1 to about 4 for metals such as lead and dialkyltin.

When the metal P-hydrocarbonphosphonate is of a two-valent metal and R' is a metal equivalent, the phosphonate is a salt having a 1:1 ratio of P-hydrocarbonphosphonate groups to metal atoms. Such a compound, for which m=2, can be represented by the formula

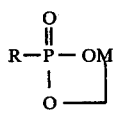

as an algebraic equivalent of

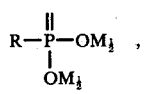

as well as by an 8-membered "cyclic dimer" or a 12-membered "cyclic trimer" or a "linear polymer" formula, and exemplified by magnesium butanephosphonate (1:1), in which R is butyl and M is magnesium.

When the metal P-hydrocarbonphosphonate is of a three-valent metal, such as antimony, and R' is an R group, such as butyl, the phosphonate is an ester-salt having three P-hydrocarbonphosphonate groups per metal atom. Such a compound, for which m=3, can be represented by the formula

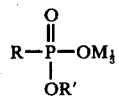

or more fully $$(R-\overset{O}{\underset{OR'}{\underset{|}{P}}}-O)_3M$$

and exemplified by antimony tri(butyl P-butanephosphonate). When the metal P-hydrocarbonphosphonate is of a three-valent metal and R' is a metal equivalent, the phosphonate is a salt having a 3:2 ratio of P-hydrocarbonphosphonate groups to metal atoms. Such a compound, for which m=3, can be represented by the formula

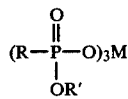

or more fully

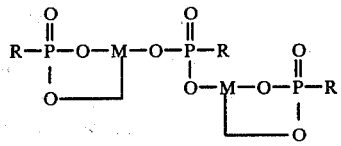

both algebraic equivalents of

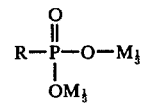

and exemplified by antimony butanephosphonate (2:3).

When the metal P-hydrocarbonphosphonate is of a four-valent metal, such as zirconium, and R' is an R group, such as butyl, the phosphonate is an ester salt having four P-hydrocarbonphosphonate groups per metal atom or, in the case of basic zirconium salts, four P-hydrocarbonphosphonate groups for two or more zirconium atoms. Such a compound, for which m=4, can be represented by the formula

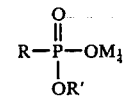

or more fully

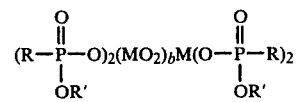

in which b is zero or an integer from 1 to about 4 in the case of basic zirconium salts, and exemplified by zirconium tetra(butyl P-butanephosphonate) in which R and R' are butyl, M is zirconium and b is zero, and zirconyl di(butyl P-butanephosphonate) in which R and R' are butyl, M is zirconium, and b is one.

When the metal P-hydrocarbonphosphonate is of a four-valent metal, such as zirconium, and R' is a metal equivalent, the phosphonate is a salt having two P-hydrocarbonphosphonate groups per metal atom or, in the case of basic zirconium salts, two P-hydrocarbonphosphonate groups for two or more zirconium atoms. Such a compound can be represented by the formula

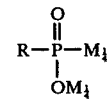

or more fully by

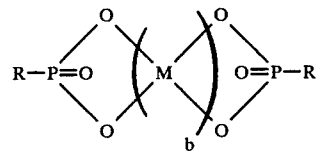

in which b is zero or an integer from 1 to about 4 in the case of basic zirconium salts, and exemplified by zirconium butanephosphonate (1:2) in which b is zero and by zirconyl butanephosphonate (1:1) in which b is one.

Several methods are available for preparing the metal P-hydrocarbonphosphonates according to this invention, for example the reaction of a hydrocarbonphosphonic acid or hydrocarbonphosphonic acid monoester with a metal oxide or hydroxide (reactions 1a and 1b below), or the reaction of alkyl metal hydrocarbonphosphonate with a metal halide or metal carboxylate (reactions 2a and 2b below), or by heating a hydrocarbonphosphonic acid diester with a metal carboxylate (reaction 3 below). The latter reaction produces as a by-product a carboxylic acid ester that need not be removed and can be left to remain as a solvent for the desired product to assist in its use according to this invention. (In the reaction equations below R and R' indicate hydrocarbon groups).

REACTION 1a

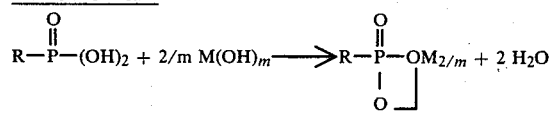

REACTION 1b

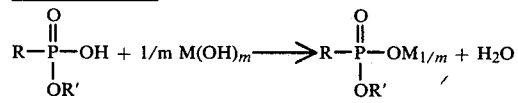

REACTION 2a

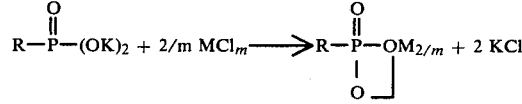

REACTION 2b

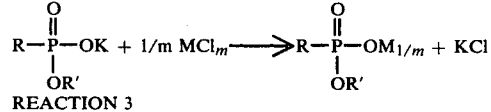

REACTION 3

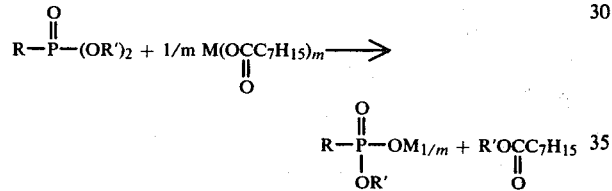

Metal P-hydrocarbonphosphonates used according to this invention can also be prepared by a reaction introducing the P-hydrocarbon group into an organic phosphorous acid ester starting material, such as by reacting a phosphorous acid monoester dialkali metal salt with a metal halide (reaction 4 below).

REACTION 4

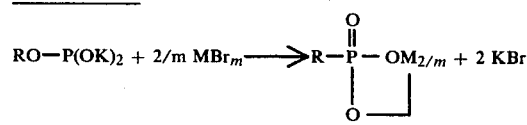

The following Synthesis Examples describe the preparation of metal P-hydrocarbonphosphonate salts according to this invention.

SYNTHESIS EXAMPLE—1

Barium Tridecanephosphonate (1:1)

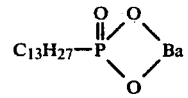

Tridecylphosphonic acid disodium salt 123 g (0.4 mole), distilled water 500 ml and ethanol 30 ml were charged into a reaction flask and dissolved by stirring at room temperature. To this solution, 20% barium chloride aq. solution 416 g (0.4 mole) was added and allowed to react for one hour at room temperature. The compound precipitated was filtered off, repeatedly washed with water until free of sodium chloride and dried to obtain 154 g of white powder.

Yield: 96% of theoretical. Ba%: 34.21 (Calculated 34.34); P%: 7.68 (calculated 7.77)

SYNTHESIS EXAMPLE—2

Zinc octadecanephosphonate (1:1)

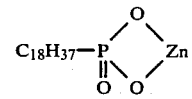

Stearylphosphonic acid disodium salt 189 g (0.5 mole), distilled water 500 ml and ethanol 30 ml were charged to a reaction flask and dissolved by stirring at room temperature. To this was added 50% zinc chloride aq. solution 136 g (0.5 mole), and allowed to react for one hour at room temperature. The compound precipitated was filtered off, repeatedly washed with water until free of sodium chloride and, dried to obtain 193 g of a white powder.

Yield: 97% of theoretical. Zn%: 16.25 (calculated 16.37); P%: 7.73 (calculated 7.81)

SYNTHESIS EXAMPLE—3

Barium di(tridecyl P-tridecanephosphonate)

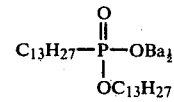

Tridecylphosphonic acid monotridecyl ester, 178 g (0.4 mole), barium hydroxide octahydrate 63 g (0.2 mole), distilled water 500 ml and ethanol 30 ml were charged into a reaction flask and reacted for two hours, at 50° C. while stirring. The compound precipitated was filtered off, and dried to obtain 199 g of white powder.

Yield: 97% of theoretical. Ba%: 13.15 (calculated 13.33); P%: 5.98 (calculated 6.04)

SYNTHESIS EXAMPLE—4

Strontium (di(butyl P-phenylmethanephosphonate)

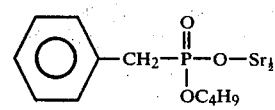

Benzylphosphonic acid dibutyl ester 227 g (0.8 mole) and 2-ethylhexoic acid strontium salt 150 g (0.4 mole) are charged in a reaction flask, and reacted for 5 hours at 150° C. while stirring, to obtain a light yellow clear liquid.

Addition of a large volume of acetone into the solution, gives a precipitate which is collected, washed with acetone, and dried to obtain the product as a white powder weighing 213 g.

Yield: 98% of theoretical. Sr%: 16.16 (calculated 16.24); P%: 11.35 (calculated 11.44)

The stabilizer composition of this invention is applicable to any vinyl chloride polymer. The term "vinyl chloride polymer" as used herein is inclusive of any polymer formed at least in part of the recurring group,

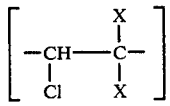

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides as a class, for example, those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with acrylonitrile, 1-butene, propylene, ethylene, 1-hexene, or vinyl n-dodecyl ether. The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C. and higher, and of plasticized polyvinyl chloride resin compositions of conventional formulation where resistance to heat distortion is not a requisite. The respective definitions of rigid and plasticized resins are as follows. The rigid resins are those resins to which plasticizers are not added, and which are generally worked at about 190° C. The ASTM definition (1961 D-883, Part 9, page 804) is as follows:

"a plastic which has a stiffness or apparent modulus of elasticity greater than 7000 grams per square centimeter (100,000 psi) at 23° C."

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

The stabilizer combinations of this invention are effective in improving initial color and heat stability of polyvinyl chloride resins in the absence of any other additives. However, it has long been recognized that polyvinyl chloride resins containing several types of heat stabilizers are better protected than those containing only one heat stabilizer. It is therefore an important aspect of this invention that these stabilizer combinations when used with additional heat stabilizers, provide greatly improved resistance to heat degradation not obtainable with the other heat stabilizers alone.

The stabilizer composition of this invention shows synergistic interaction and provides improved effectiveness when used together with certain known useful additives, including 1,2-epoxides, hindered phenols, organic phosphites, the esters, amides, and hydrazides of thiodialkylenedicarboxylic acids, 3-aminocrotonic acid, and nitrilotrialkylenetricarboxylic acids, ketoacetic acid compounds, aliphatic polyhydric alcohols having 3 to 8 alcoholic hydroxyl groups, aliphatic and aromatic betadiketones, and certain polyether alcohol esters of phosphoric acid.

Phenol stabilizers can be included with the stabilizer composition of this invention in amounts corresponding to 0.01 to about 0.2 parts per parts of polymer being stabilized. Typical phenol stabilizers are butylated hydroxy-toluene (BHT), 4,4'-isopropylidenebisphenol, and 1,1,3-tris(2'-methyl-4'-hydroxy-5'-t-butylphenyl)butane. A comprehensive disclosure of phenol stabilizers at column 16 line 49 to column 21 line 8 of M. Minagawa U.S. Pat. No. 3,849,370 issued Nov. 19, 1974 is here incorporated by reference.

Aliphatic polyhydroxy compounds can be included with the stabilizer composition of this invention in amounts corresponding to 0.1 to about 1 part per 100 parts of polymer being stabilized. Typical aliphatic polyhydroxy compounds are glycerol, polyglycerol, mono-, di-, and tripentaerythritol, mannitol, sorbitol, and partial esters of these with saturated and unsaturated fatty acids having 6 to 22 carbon atoms.

Organic phosphite stabilizers can be included with the stabilizer composition of this invention in amounts corresponding to 0.05 to about 2 parts by weight per 100 parts by weight of polymer being stabilized. Typical phosphite stabilizers are triphenyl phosphite, diphenyl phosphite, tris(nonylphenyl) phosphite, 2-ethylhexyl diphenyl phosphite, diisodecyl phenyl phosphite, trinonyl phosphite, and pentaerythritol bis(n-octadecyl phosphite). The phosphite stabilizer can have one or a plurality of phosphite ester groups and from 10 to about 75 carbon atoms. A comprehensive disclosure of organic phosphite stabilizers at column 13 line 63 to column 15 line 48 of M. Minagawa U.S. Pat. No. 3,849,370 is here incorporated by reference.

Oxirane or 1,2-epoxide stabilizers can be included with the stabilizer composition of this invention in amounts corresponding to 0.2 to about 20 parts by weight per 100 parts by weight of polymer being stabilized. Typical 1,2-epoxide stabilizers are epoxidized polybutadiene, epoxysoybean oil, epoxylinseed oil, and 2-ethylhexyl epoxystearate. The epoxide stabilizer can have one or a plurality of oxirane or 1,2-epoxide groups and from 15 to 150 carbon atoms. A comprehensive disclosure of epoxide stabilizers at column 26 lines 12 to 40 and column 27 lines 17 to 51 of M. Minagawa U.S. Pat. No. 3,869,423 is here incorporated by reference.

The esters, amides, and hydrazides of thiodialkylene dicarboxylic acids and nitrilotri-alkylenetricarboxylic acids can be included with the stabilizer composition of this invention in amounts corresponding to 0.1 to about 1 part per 100 parts of polymer. Typical of these are dimethyl thiodipropionate, dilauryl and distearyl thiodipropionates, 2,2'-thiobis(acetyl ethanolamine), 3,3'-thiobis(propionyldiisopropanolamine, nitrilotriacetic acid (NTA) propylene glycol ester, NTA tris (ethylamide), NTA bis(hydroxyethyl) N-butylamide, 3,3'-thiodipropionyldihydrazide and 6,6'-thiodihexanoyldihydrazide. A comprehensive disclosure of thiodipropionate compounds that can be used from column 21 line 9 to column 22 line 65 of M. Minagawa U.S. Pat. No. 3,849,370 is here incorporated by reference.

Ketoacetic acid compounds that can be used with the stabilizer compositions of this invention in amounts of about 0.05 to about 0.5 parts per 100 parts of polymer being stabilized include 2-ethylhexyl acetoacetate, glyceryl tris(acetoacetate) and dehydroacetic acid. A comprehensive disclosure of ketoacetic acid compounds that can be used from column 2 line 32 to column 5 line 10 of U.S. Pat. No. 3,346,536 issued Oct. 10, 1967 is here incorporated by reference.

Organic nitrogen compounds that can be used with the stabilizer compositions of this invention in amounts of about 0.05 to about 0.5 parts per 100 parts of polymer being stabilized include 2-ethylhexyl 3-aminocrotonate, 1,4-butanediol bis(3-aminocrotonate) and 2,2′thiodiethyl 2-aminocrotonate; thiocarbanilide and 2-phenylindole, 1,3-dibutylthiourea, phenylurea, and p-ethoxyphenylurea.

Betadiketones also called 1,3-diketones, or diacylmethanes have two to three acyl groups linked to a single carbon atom. The acyl groups can be aromatic, cycloaliphatic, or aliphatic, and preferably have from 2 to 30 carbon atoms. Using the diacylmethane system of nomenclature, illustrative 1,3-diketone compounds that can be used in the stabilized vinyl chloride compositions of this invention include acetylhexanoyl-methane, acetyl-heptanoyl-methane, hexanol-propanoyl methane, acetyl-octadecanoyl-methane, acetyl-tetradecanoyl-methane, acetyl-dodecanoyl-methane, di-octadecanoyl-methane, butanoyl-octanoyl-methane, 1-acetyl-1-octanoyl-ethane, triacetylmethane, trihexanoylmethane, acetyl-benzoyl-methane, hexanoyl-benzoyl-methane, Octadecanoyl-benzoyl-methane, tetradecanoyl-benzoyl-methane, Dodecanoyl-benzoyl-methane, formyl-benzoyl-methane, heptanoyl-benzoyl-methane, acetyl-hexahydrobenzoylmethane, dibenzoylmethane, phenylacetyl-benzoyl-methane, benzoyl-nonylbenzoyl-methane, benzoylidacetyl-methane, di(hexahydrobenzoyl)methane, tribenzoylmethane, benzoyl-p-methoxybenzoyl-methane, di(p-methoxybenzoyl)methane, di(p-chlorobenzoyl)methane, di(3,4-methylenedioxbenzoyl)methane, 1-acetyl-1-benzoylnonane, alpha-acetyl-alpha-benzoyl-toluene, di(p-t-butylbenzoyl)methane, benzoyl-trifluoroacetyl-methane, diacetylmethane, acetyl-octanoyl-methane, and dipivaloylmethane.

Alkyl acid phosphates have 1 to 2 alkyl groups of 8 to 20 carbon atoms per phosphate ester group. Stearyl acid phosphate, di(2-ethylhexyl)acid phosphate, and dilauryl acid phosphate are representative.

Ether alcohol acid phosphate esters have 1 to 2 ether alcohol groups per phosphate ester group, and can be presented by a formula

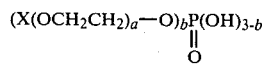

where the number of ether groups in the ether alcohol represented by a is from 1 to about 22 and the number of ether alcohol groups represented by b is from 1 to 2, and X is a hydrocarbon group having 1 to about 20 carbom atoms. Commercial mixtures of homologous products, usually characterized by an average value of a, such as ethoxylated nonylphenol phosphate with average of 6 oxyethylene units or ethoxylated $C_{12}$-$C_{15}$ alkyl phosphate with average of 12 oxyethylene units are satisfactory.

Stabilizer compositions in accordance with this invention can be in solid, liquid or paste form. Liquid compositions can be prepared by blending the ingredients and heating at 40° to 200° C. for up to 6 hours to achieve visual homogeneity and storage stability. Inert ingredients that can be added to the stabilizer compositions to improve their handling convenience include solvents such as hydrocarbons, 2-ethylhexanol, isodecyl alcohol, 2-ethoxyethanol, and 2(2-butoxyethoxy)ethanol; paste consistency modifiers such as finely divided silica, polyethylene glycols and polypropylene glycols and their monoalkyl and monaryl ethers, and water; anticaking agents such as talc, magnesium trisilicate, sodium silicoaluminate, and aluminum calcium silicate.

Following are the methods used in testing vinyl chloride polymer compositions containing stabilizer compositions according to this invention or control compositions used for comparison purposes.

Oven heat stability:

Samples of each indicated formulation proportioned to 200 grams of vinyl chloride polymer are compounded on a two-roll mill until well mixed and removed in the form of sheets 1 mm in thickness. Strips cut from each sheet are exposed in an air circulating oven at the indicated temperature, and one strip of each formulation removed every five minutes and attached to a record card. Heat stability was recorded as the time in minutes to the first failure point represented by a deep orange, red, brown or black color.

Clarity and Initial Color:

These properties are rated visually by comparing samples of each indicated formulation to a standard, to which is assigned the rating "medium". Unless otherwise indicated, the standard used is a sample of Control 1-1, e.g. the base formulation of Example 1 with 0.7 part barium stearate and 0.3 part zinc stearate as stabilizers. Clarity is rated by viewing samples against a black background and initial color by viewing samples against a white background.

Plate-out:

Calender or roll plate-out is caused by an incompatibility of vinyl chloride polymer compound constituents under processing conditions with subsequent deposit on the rolls of the equipment. As the deposit builds up in thickness, it will affect the surface appearance of the vinyl sheeting being produced and it may interfere with heat sealability and printability of the material.

Plate-out is measured through incorporation in the test compound of a red pigment which tends to disperse within the plate-out layer. The red plate-out layer on the mill rolls is then picked up by a clean-up batch. The extent of discoloration of the clean-up batch is a measure of the test compound's tendency to plate-out.

The test procedure is as follows:

There is added to the test compound 2 phr of a 50% pigment dispersion in DOP of Permanent Red 2B pigment. The test compound is charged to the laboratory mill and allowed to run on the mill without disturbing it 3 minutes after the compound is fused and well mixed. The mill temperature is 172°–177° C. After 3 minutes, the red pigmented compound is removed from the mill and discarded. The following clean-up compound is then charged to the mill and run for 3 minutes.

| Resin | 100 | parts by weight |
|---|---|---|
| DOP | 30 | |
| TiO$_2$ | 2 | |
| Precipitated silica | 2 | |
| Liquid cadmium-barium stabilizer | 2 | |
| Stearic acid | 0.5 | |

The quantity of clean-up compound is proportioned to 200 parts of resin. The clean-up compound removes from the mill the plate-out and red pigment left from the test compound. The extent of color development of the clean-up compound is a measure of the test compound's plate-out characteristics. A numerical measure of plate-out is provided by comparing the colored clean-up compound with a series of standard compounds to which known amounts of the red pigment are added. The numerical "plate-out value", then, is the concentration of pigment, in mg/kg of resin, that most nearly matches the color of the clean-up compound at the end of the test.

Weatherability: Samples are exposed in a carbon arc accelerated weathering unit (Atlas Electric Devices Co. "Weatherometer") operated without water spray at 52° C. black panel temperature and 41°–44° C. air temperature. Samples are examined once daily for failure signs including spotting, uniform darkening, stiffening, and/or embrittlement, any one of which marks the failure of the sample. Weatherability is expressed in hours to such failure.

The metal P-hydrocarbonphosphonates contained in stabilizer compositions examined in vinyl chloride polymers stabilized according to this invention are included in the listing of compounds by name and abbreviated formula in Table 1.

TABLE 1
Metal P-hydrocarbonphosphonates

No. 1 Barium tridecanephosphonate (1:1)

$$C_{13}H_{27}-P(=O)(O-)(O-)Ba$$

No. 2 Calcium tridecanephosphonate (1:1)

$$C_{13}H_{27}-P(=O)(O-)(O-)Ca$$

No. 3 Magnesium tridecanephosphonate (1:1)

$$C_{13}H_{27}-P(=O)(O-)(O-)Mg$$

No. 4 Zinc octadecanephosphonate (1:1)

$$C_{18}H_{37}-P(=O)(O-)(O-)Zn$$

No. 5 Barium di(ethyl P-octanephosphonate)

$$C_8H_{17}-P(=O)(OC_2H_5)-O-Ba_{\frac{1}{2}}$$

No. 6 Barium di(phenyl P-octanephosphonate)

$$C_8H_{17}-P(=O)(OC_6H_5)-O-Ba_{\frac{1}{2}}$$

No. 7 Calcium di(p-t-butylphenyl P-dodecanephosphonate)

$$C_{12}H_{25}-P(=O)(O-C_6H_4-t-C_4H_9)-Ca_{\frac{1}{2}}$$

No. 8 Barium di(nonylphenyl P-dodecanephosphonate)

TABLE 1-continued
Metal P-hydrocarbonphosphonates $$C_{12}H_{25}-P(=O)(O-Ba_{\frac{1}{2}})(O-C_6H_4-C_9H_{19})$$

No. 9 Barium phenylmethanephosphonate (1:1)

$$C_6H_5-CH_2-P(=O)(O-)(O-)Ba$$

No. 10 Magnesium phenylmethanephosphonate (1:1)

$$C_6H_5-CH_2-P(=O)(O-)(O-)Mg$$

No. 11 Calcium di(dodecyl P-phenylmethanephosphonate)

$$C_6H_5-CH_2-P(=O)(OC_{12}H_{25})-O-Ca_{\frac{1}{2}}$$

No. 12 Barium di(toly P-phenylmethanephosphonate)

$$C_6H_5-CH_2-P(=O)(O-Ba_{\frac{1}{2}})(O-C_6H_4-CH_3)$$

No. 13 Strontium di(butyl P-phenylmethanephosphonate)

$$C_6H_5-CH_2-P(=O)(OC_4H_9)-O-Sr_{\frac{1}{2}}$$

No. 14 Calcium $C_{20-28}$ alkanephosphonate (1:1)

$$C_{20\sim28}H_{41\sim57}-P(=O)(O-)(O-)Ca$$

No. 15 Barium di(cyclohexyl P-octanephosphonate)

$$C_8H_{17}-P(=O)(O-Ba_{\frac{1}{2}})(O-C_6H_{11})$$

No. 16 Zinc di(benzyl P-tridecanephosphonate)

$$C_{13}H_{27}-P(=O)(O-Zn_{\frac{1}{2}})(O-CH_2-C_6H_5)$$

No. 17 Strontium di(2,4-di-t-butylphenyl P-tridecanephosphonate)

$$C_{13}H_{27}-P(=O)(O-Sr_{\frac{1}{2}})(O-C_6H_3(t-C_4H_9)_2)$$

No. 18 Barium di(xylyl P-octanephosphonate)

TABLE 1-continued

Metal P-hydrocarbonphosphonates

No. 19 Barium o-tolylmethanephosphonate (1:1)

No. 20 Calcium p-tolylmethanephosphonate (1:1)

No. 21 Barium di(p-methylbenzyl P-dodecanephosphonate)

No. 22 Barium octanephosphonate (1:1)

No. 23 Barium butanephosphonate (1:1)

No. 24 Barium dodecanephosphonate (1:1)

No. 25 Barium di(tridecyl P-tridecanephosphonate)

No. 26 Zinc octanephosphonate (1:1)

No. 27 Cadmium di(ethyl P-octanephosphonate)

No. 28 Lead di(octyl P-butanephosphonate)

No. 29 Cadmium di(phenyl P-octanephosphonate)

No. 30 Sodium ethyl P-octanephosphonate

No. 31 Nickel di(p-t-butylphenyl P-dodecanephosphonate)

No. 32 Potassium p-t-butylphenyl P-dodecanephosphonate

No. 33 Stannous di(p-nonylphenyl P-alkane ($C_{12-15}$) phosphonate

No. 34 Antimony tri(dodecyl P-phenylmethanephosphonate)

No. 35 Dibutyltindi(benzyl P-tridecanephosphonate)

No. 36 Cadmium di(p-tolyl P=phenylmethanephosphonate)

No. 37 Lithium octyl P-phenylmethanephosphonate

No. 38 Zirconium tetra(butyl P-phenylmethanephosphonate)

No. 39 Cadmium di(2,4-di-t-butylphenyl P-tridecanephosphonate)

No. 40 Nickel di(cyclohexyl P-octanephosphonate)

TABLE 1-continued
Metal P-hydrocarbonphosphonates

No. 41 Lead di(xylyl P-octanephosphonate)

$C_8H_{17}-\overset{\overset{O}{\|}}{\underset{\underset{\bigcirc-H}{|}}{P}}-ONi_{\frac{1}{2}}$ No. 42 Sodium cyclohexylphenyl P-dodecanephosphonate $C_8H_{17}-\overset{\overset{O}{\|}}{\underset{\underset{\bigcirc(CH_3)(CH_3)}{|}}{P}}-OPb_{\frac{1}{2}}$ No. 43 Antimony tri(P-methylbenzyl P-dodecanephosphonate)

$C_{12}H_{25}-\overset{\overset{O}{\|}}{\underset{\underset{\bigcirc-H}{|}}{P}}-ONa$ No. 44 Dioctyltin di(octyl P-octanephosphonate)

$C_{12}H_{25}-\overset{\overset{O}{\|}}{\underset{\underset{O-CH_2-\bigcirc-CH_3}{|}}{P}}-OSb_{\frac{1}{3}}$ No. 45 Lead di(tridecyl P-tridecanephosphonate)

$C_8H_{17}-\overset{\overset{O}{\|}}{\underset{\underset{C_8H_{17}O}{|}}{P}}-\overset{C_8H_{17}}{\underset{C_8H_{17}}{OSn_{\frac{1}{2}}}}$ No. 46 Cadmium di(2-ethoxyethyl P-octanephosphonate)

$C_{13}H_{27}-\overset{\overset{O}{\|}}{\underset{\underset{C_{13}H_{27}O}{|}}{P}}-OPb_{\frac{1}{2}}$ No. 47 Cadmium tridecanephosphonate (1:1)

$C_8H_{17}-\overset{\overset{O}{\|}}{\underset{\underset{C_2H_5OC_2H_4O}{|}}{P}}-OCd_{\frac{1}{2}}$ No. 48 Sodium dodecanephosphonate (2:1)

$C_{13}H_{27}-\overset{O}{\underset{O}{\overset{\|}{P}}}\diagdown_{O}^{\diagup}Cd$ No. 49 Lead tridecanephosphonate (1:1)

$C_{12}H_{25}-\overset{O}{\underset{ONa}{\overset{\|}{P}}}\diagdown^{ONa^-}$

No. 50 Nickel tridecanephosphonate (1:1)

$C_{13}H_{27}-\overset{O}{\underset{O}{\overset{\|}{P}}}\diagdown_{O}^{\diagup}Pb$ No. 51 Dibutyltin octadecanephosphonate (1:1)

$C_{13}H_{27}-\overset{O}{\underset{O}{\overset{\|}{P}}}\diagdown_{O}^{\diagup}Ni$

TABLE 1-continued
Metal P-hydrocarbonphosphonates

No. 52 Potassium octanephosphonate (2:1)

$C_{18}H_{37}-\overset{O}{\underset{O}{\overset{\|}{P}}}\diagdown_{O}^{\diagup}\overset{C_4H_9}{\underset{C_4H_9}{Sn}}$ No. 53 Cadmium phenylmethanephosphonate (1:1)

$C_8H_{17}-\overset{O}{\underset{OK}{\overset{\|}{P}}}\diagdown^{OK}$

No. 54 Lead phenylmethanephosphonate (1:1)

$\bigcirc-CH_2-\overset{O}{\underset{O}{\overset{\|}{P}}}\diagdown_{O}^{\diagup}Cd$ No. 55 Antimony o-tolylmethanephosphonate (2:3)

$\bigcirc-CH_2-\overset{O}{\underset{O}{\overset{\|}{P}}}\diagdown_{O}^{\diagup}Pb$ $\bigcirc(CH_3)-CH_2-\overset{O}{\underset{O}{\overset{\|}{P}}}-Sb-O-\overset{\overset{CH_2-\bigcirc(CH_3)}{|}}{\underset{\underset{O}{\|}}{P}}-O-Sb-\overset{O}{\underset{O}{\overset{\|}{P}}}-CH_2-\bigcirc(CH_3)$ No. 56 Lithium phenylmethanephosphonate (2:1)

$\bigcirc-CH_2-\overset{O}{\underset{OLi}{\overset{\|}{P}}}\diagdown^{OLi}$

No. 57 Zirconium p-tolylmethanephosphonate (1:2)

$CH_3-\bigcirc-CH_2-\overset{O}{\underset{O}{\overset{\|}{P}}}\diagdown_{O}^{\diagup}Zr\diagdown_{O}^{\diagup}\overset{O}{\underset{O}{\overset{\|}{P}}}-CH_2-\bigcirc-CH_3$ No. 58 Cadmium $C_{20-28}$ alkanephosphonate (1:1)

$C_{20\sim28}H_{41\sim57}-\overset{O}{\underset{O}{\overset{\|}{P}}}\diagdown_{O}^{\diagup}Cd$ No. 59 Stannous octanephosphonate (1:1)

$C_8H_{17}-\overset{O}{\underset{O}{\overset{\|}{P}}}\diagdown_{O}^{\diagup}Sn$

No. 60 Lead octanephosphonate (1:1)

$C_8H_{17}-\overset{O}{\underset{O}{\overset{\|}{P}}}\diagdown_{O}^{\diagup}Pb$

EXAMPLES 1-1 TO 1-5

A sheet of 1 mm in thickness was prepared by mixing on a two roll mill the following formulation, and submitted to the performance tests shown.

The stabilizer compositions used and the test results are shown in Table-2.

| (Formulation) | |
|---|---|
| PVC (Geon 103EP) | 100 parts by weight |
| DOP | 48 |
| Epoxidized soybean oil | 2.0 |
| Stearic acid | 0.2 |

| (Formulation) | |
|---|---|
| Stabilizers | as shown in Table-2 |

Table - 2

| No. | Control | | Examples | | | |
|---|---|---|---|---|---|---|
| Stabilizers | 1-1 | 1-1 | 1-2 | 1-3 | 1-4 | 1-5 |
| Ba stearate | 0.7 | | | | | 0.3 |
| Zn stearate | 0.3 | 0.3 | 0.3 | 0.3 | 0.3 | 0.3 |
| Ba tridecanephosphonate (1:1) | | 0.4 | | | | |
| Ba di (ethyl P-octanephosphonate) | | | 0.4 | | | |
| Ca tridecanephosphonate (1:1) | | | | 0.4 | | 0.2 |
| Ba phenylmethanephosphonate (1:1) | | | | | 0.4 | |
| Heat Stability (190° C.)min. | 45 | 70 | 70 | 60 | 60 | 60 |
| Initial Color | medium | very good | very good | very good | very good | very good |
| Clarity | " | very good | very good | very good | very good | very good |
| Plate Out (mg/kg) | 150 | 5 | 5 | 5 | 5 | 15 |

The stabilizer compositions of this invention are shown to be superior to Control 1-1 in every property examined.

EXAMPLES 2-1 TO 2-4

Milled sheets of PVC with various barium-zinc combinations were submitted to performance tests carried out in the same way as in Examples 1-1 to 1-5.

The stabilizers used and the test results are shown in Table-3.

| (Formulation) | |
|---|---|
| PVC (Geon 103 EP) | 100 parts by weight |
| DOP | 50 |
| Stearic acid | 0.3 |
| Epoxidized soybean oil | 2.0 |
| Zn toluate | 0.7 |
| Ba salts (Table-3) | Variable weights* |

*adjusted to same Ba level as 1.1 part by weight of Ba nonylphenolate

Table-3

| No. | Basalts (phr) | Initial Color | Clarity | Heat Coloring | Heat Stability (175° C.) min | Plate Out Value mg/kg | Weatherability hours |
|---|---|---|---|---|---|---|---|
| Control 2-1 | Ba nonylphenolate (1:1) | Inferior to Control 1-1 | Inferior to Control 1-1 | very inferior | 90 | 350 | 950 |
| Example 2-1 | Ba tridecanephosphonate (1:1) (0.8) | good | good | very good | 105 | 10 | 1800 |
| 2-2 | Ba di(phenyl P-octanephosphonate) (1.3) | " | " | " | 105 | 5 | 1700 |
| 2-3 | Ba di(poly P-phenylmethanephosphonate (1.3) | " | " | " | 120 | 10 | 1750 |
| 2-4 | Ba di(cyclohexyl P-octanephosphonate) (1.3) | " | " | " | 120 | 10 | 2000 |

The results show the superiority of the stabilizer composition of this invention in each property examined.

EXAMPLES 3-1 TO 3-15

The performance tests shown were carried out on samples milled up according to the following formulation for agricultural film.

The metal P-hydrocarbonphosphonate added to each formulation and the test results are shown in Table-4.

| (Formulation) | |
|---|---|
| PVC (Geon 103EP) | 100 parts by weight |
| DOP | 45 |
| Trixylylphosphate | 5 |
| Epoxidized soybean oil | 3 |
| Bisphenol A diglycidyl ether (Epikote 828) | 2 |
| Ba stearate | 0.4 |
| Zn stearate | 0.8 |
| Diphenylisooctylphosphite | 0.5 |
| Sorbitan monopalmitate (anti-fog additive and lubricant) | 1.5 |
| Samples (Table-4). | 0.8 |

Table 4

| No. | Samples | Heat Stability (190° C.) min | Weatherability hours |
|---|---|---|---|
| Control | | | |
| 3-1 | none | 60 | 600 |
| 3-2 | Ba bis(monoisooctyl acidphosphate) | 105 | 1300 |
| 3-3 | Ca bis(monotridecyl acidphosphate) | 90 | 1200 |
| 3-4 | Ni bis(monotridecyl acidphosphate) | 90 | 1200 |
| Example | | | |
| 3-1 | Mg tridecanephosphonate (1:1) | 120 | 2000 |
| 3-2 | Ca di(p-t-butylphenyl P-dodecanephosphonate | 110 | 1800 |
| 3-3 | Ba di(nonylphenyl P-dodecanephosphonate) | 120 | 2000 |
| 3-4 | Ca di(dodecyl P-phenylmethanephosphonate) | 115 | 1900 |
| 3-5 | Sr di(butyl P-phenylmethanephosphonate) | 130 | 2000 |
| 3-6 | Ba di(cyclohexyl P-octanephosphonate) | 130 | 2100 |
| 3-7 | Ba di(xylyl P-octanephosphonate) | 125 | 2100 |
| 3-8 | Ba O-tolymethanephosphonate (1:1) | 130 | 2200 |
| 3-9 | Ba di(p-methylbenzyl P-dodecanephosphonate) | 130 | 2000 |
| 3-10 | Ba dodecanephosphonate (1:1) | 125 | 1900 |
| 3-11 | Li octyl P-phenyl- | | |

Table 4-continued

| No. | Samples | Heat Stability (190° C.) min | Weatherability hours |
|---|---|---|---|
| | methanephosphonate | 120 | 2100 |
| 3-12 | Ni di(cyclohexyl P-octanephosphonate) | >120 | 2600 |
| 3-13 | Na cyclohexylphenyl P-dodecanephosphonate | 120 | 2000 |
| 3-14 | Li phenylmethane-phosphonate (2:1) | 120 | 2100 |
| 3-15 | Zr p-tolylmethane-phosphonate (1:2) | 120 | 2700 |

As shown by the above results, agricultural film formulations containing the stabilizer compositions of this invention were dramatically improved over prior art formulations.

EXAMPLES 4-1 to 4-11

The same tests as in Examples 1-1 to 1-4 were carried with a composition of this invention to which varying organic phosphites were added.

The organic phosphites used and the test results are shown in the following Table-5.

| (Formulation) | |
|---|---|
| PVC | 100 parts by weight |
| DOP | 50 |
| Stearic acid | 0.3 |
| Zn toluate | 0.7 |
| Ba tridecanephosphonate (1:1) | 0.7 |
| Epoxidized linseed oil | 1.0 |
| Organic phosphite (Table-5) | 0.5 |

Table 5

| No. | Organic Phosphites | Heat Stability (175° C.) min | Initial Color* | Clarity* |
|---|---|---|---|---|
| Example | | | | |
| 4-1 | none | 60 | good | good |
| 4-2 | mono-(2-ethylhexyl)diphenyl-phosphite | 80 | very good | very good |
| 4-3 | ditridecylmonophenyl-phosphite | 85 | very good | very good |
| 4-4 | diisodecylmonophenyl-phosphite | 80 | very good | very good |
| 4-5 | monotridecyldiphenyl-phosphite | 80 | very good | very good |
| 4-6 | tris(nonylphenyl)-phosphite | 75 | very good | very good |
| 4-7 | tris(2,4-di-t-butylphenyl)-phosphite | 75 | very good | very good |
| 4-8 | triphenylphosphite | 70 | very good | very good |
| 4-9 | diphenylacid-phosphite | 90 | very good | very good |
| 4-10 | diisodecylacid-phosphite | 90 | very good | very good |
| 4-11 | monoisodecylacid-phosphite | 90 | very good | very good |

*by comparison to Control 1-1 above.

The test results show the beneficial interaction of organic phosphites with the stabilizer composition of this invention.

EXAMPLES 5-1 to 5-15

To observe the synergistic effect when there are incorporated in PVC other additives together with the stabilizer composition of this invention, the same tests as in Examples 1-1 to 1-5 were carried out with samples of the following formulation.

The additives used and the test results are shown in Table-6.

| (Formulation) | Parts by weight |
|---|---|
| PVC (Geon 103EP) | 100 |
| DOP | 48 |
| Epoxidized soybean oil | 2.0 |
| Zn octoate | 0.2 |
| Ca tridecanephosphonate (1:1) | 0.7 |
| Stearic acid | 0.3 |
| Additives (Table 6) | |

Table 6

| Example No. | Additives | Amount (phr) | Heat Stability (175° C.) mins |
|---|---|---|---|
| 5-1 | none | — | 70 |
| 5-2 | BHT antioxidant | 0.2 | 95 |
| 5-3 | dilaurylthiodipropionate | 0.2 | 95 |
| 5-4 | diphenylthiourea | 0.2 | 95 |
| 5-5 | thiodiglycol bis (aminocrotonate) | 0.3 | 110 |
| 5-6 | stearyl acid phosphate | 0.3 | 110 |
| 5-7 | pentaerythritol | 0.3 | 100 |
| 5-8 | tris(hydroxyethyl) isocyanurate | 0.3 | 100 |
| 5-9 | dehydroacetic acid | 0.05 | 95 |
| 5-10 | Zn dehydroacetate | 0.3 | 95 |
| 5-11 | benzoylacetone | 0.05 | 100 |
| 5-12 | dibenzoylmethane | 0.05 | 100 |
| 5-13 | sorbitol | 0.3 | 115 |
| 5-14 | nonylphenoxypolyethoxy phosphoric acid | 0.2 | 105 |
| 5-15 | tridecyloxypolyethoxy phosphoric acid | 0.2 | 105 |

These results show the helpful interaction of the above additives with the stabilizer composition of this invention.

EXAMPLES 6-1 to 6-7

To examine the effect in a polymer blend of PVC and ABS, a sheet was prepared according to the following formulation, and used to measure heat stability at 190° C., plate-out value and clarity.

The stabilizers used and the test results are shown in Table-7.

| (Formulation) | Parts by weight |
|---|---|
| PVC (Geon 103EP-8) | 100 |
| ABS (Blendex 111) | 10 |
| Epoxidized soybean oil | 3 |
| cq stearate | 0.2 |
| Tetra(C$_{12-15}$ alkyl)bis phenol diphosphite | 1.5 |
| Samples (Table 7) | 1.2 total, as shown |

Table 7

| No. | Sample | Heat Stability (190° C.) | Plate Out Value | Clarity |
|---|---|---|---|---|
| | | min | mg/kg | |
| Control | | | | |
| 6-1 | Ca ricinoleate | 0.7 | 75 | 250 | Inferior to Control 1-1 |
| | Zn octoate | 0.5 | | | |
| Example | | | | |
| 6-1 | Ca p-tolylmethane-phosphonate (1:1) | 0.7 | 90 | 25 | Superior |
| | Zn octoate | 0.5 | | | |
| 6-2 | Zn octadecane-phosphonate (1:1) | 0.5 | 105 | 10 | " |
| | Ca di(p-t-butylphenyl P-dodecanephosphonate) | 0.7 | | | |
| 6-3 | Mg tridecane-phosphonate (1:1) | 0.7 | 95 | 25 | " |
| | Zn octanephosphonate (1:1) | 0.5 | | | |
| 6-4 | Mg phenylmethane-phosphonate (1:1) | 0.7 | 100 | 15 | " |
| | Zn di(benzyl P-tridecane-phosphonate) | 0.5 | | | |
| 6-5 | Ca $C_{20-28}$alkane-phosphonate (1:1) | 0.7 | 105 | 10 | " |
| | Zn di(benzyl P-tridecane-phosphonate) | 0.5 | | | |
| 6-6 | Sr di(2,4-di-t-butylphenyl P-tridecanephosphonate) | 0.3 | 100 | 20 | " |
| | Ba octanephosphonate (1:1) | 0.4 | | | |
| | Zn octanephosphonate (1:1) | 0.5 | | | |
| 6-7 | Ba butanephosphonate (1:1) | 0.7 | 105 | 10 | " |
| | Zn laurate | 0.5 | | | |

These results show that PVC-ABS polymer blends are improved in each property tested by the stabilizer compositions of this invention.

EXAMPLES 7-1 to 7-12

A sheet of 1 mm in thickness was prepared by milling each of the following formulations and submitted to heat-ageing at 190° C., initial color, plate-out, and weatherability measurements.

The results are shown in the following Table-8.

| (Formulation) | Parts by weight |
|---|---|
| PVC (Geon 103EP) | 100 |
| DOP | 20 |
| Epoxidized soybean oil | 2 |
| Stearic acid | 0.2 |
| Monooctyldiphenyl phosphite | 0.5 |
| Stabilizer | as shown in Table 8 |

Table 8

| No. | Stabilizers | Amount (Parts by Weight) | Heat Stability (190° C.) min | Initial Color* | Clarity* | Plate Out Value | Weatherability hrs |
|---|---|---|---|---|---|---|---|
| Control | | | | | | | |
| 7-1 | Ba stearate | 0.6 | 90 | medium | medium | 120 | 800 |
| | Cd stearate | 0.4 | | | | | |
| 7-2 | (iso—$C_8H_{17}O$—P(=O)(H)—O)$_2$Cd | 0.3 | 75 | Inferior | good | 100 | 600 |
| | Ba stearate | 0.7 | | | | | |
| Example | | | | | | | |
| 7-1 | Zn stearate | 0.3 | 105 | good | good | 5 | 2500 |
| | Ni di(p-t-butylphenyl P-dodecanephosphonate) | 0.7 | | | | | |
| 7-2 | Zn octoate | 0.2 | 105 | good | very good | 10 | 1800 |
| | Ba octanephos-phonate (1:1) | 0.8 | | | | | |
| 7-3 | Ba-12-OH-stearate | 0.7 | 120 | very good | very good | 5 | 2000 |
| | Cd di(phenyl P-octane-phosphonate) | | | | | | |
| 7-4 | Zn laurate | 0.5 | 105 | very good | good | 10 | 1700 |
| | Cd di(phenyl P-octanephosphonate) | 0.5 | | | | | |
| 7-5 | Zn myristate | 0.2 | 105 | good | " | 10 | 2300 |
| | Ni tridecane-phosphonate (1:1) | 0.6 | | | | | |
| 7-6 | Zn octoate | 0.3 | 105 | " | " | 15 | 1800 |
| | Ba octanephos-phonate (1:1) | 0.7 | | | | | |
| 7-7 | Na octoate | 0.6 | | | | | |

Table 8-continued

| No. | Stabilizers | Amount (Parts by Weight) | Heat Stability (190° C.) min | Initial Color* | Clarity* | Plate Out Value | Weather-ability hrs |
|---|---|---|---|---|---|---|---|
|  | Pb di(octyl P-butane-phosphonate) | 0.2 | 105 | " | " | 10 | 1700 |
| 7-8 | Cd stearate | 0.2 |  |  |  |  |  |
|  | K octanephosphonate (2:1) | 0.8 | 120 | very good | good | 5 | 2000 |
| 7-9 | Ni stearate | 0.6 |  |  |  |  |  |
|  | Sb tri(dodecyl P-phenyl methanephosphonate) | 0.4 | 105 | good | " | 5 | 1800 |
| 7-10 | Ba octoate | 0.7 |  |  |  |  |  |
|  | Ba di(p-methylbenzyl P-dodecanephosphonate) | 0.3 | 105 | very good | very good | 5 | 2000 |
| 7-11 | Cd laurate | 0.4 |  |  |  |  |  |
|  | Na cyclohexylphenyl P-dodecanephosphonate | 0.6 | 120 | " | good | 5 | 1700 |
| 7-12 | Ba ricinolate | 0.7 |  |  |  |  |  |
|  | Ba a-tolymethane-phosphonate (1:1) | 0.2 | 105 | " | " | 5 | 2200 |

*Compared to Control 7-1

The results show that the stabilizer compositions of this invention are dramatically superior to prior art compositions in every property tested.

EXAMPLES 8-1 to 8-7

Performance tests were carried out as shown in Table-9 with PVC samples of the following formulation.

The stabilizers used and the test results are shown in Table-9.

| (Formulation) | Parts by weight |
|---|---|
| PVC (Geon 103EP) | 100 |
| DOP | 50 |
| Stearic acid | 0.3 |
| Epoxidized soybean oil | 2.0 |
| Zinc toluate | 0.7 |
| Stabilizer Table 9) | Variable weight* |

*equivalent in moles of metal to 1.1 part by weight of Ba-nonyl phenolate.

Table 9

| No. | Stabilizers phr | Heat Stability (175° C.) min | Plate Out Value | Weather-ability hrs |
|---|---|---|---|---|
| Control |  |  |  |  |
| 8-1 | Ba nonylphenolate (1.1 part by weight) | 85 | 350 | 800 |
| 8-2 | Ba tetraphenyldiphosphite (1.2) | 20 | 20 | 900 |
| 8-3 | Ba tetratridecyldiphosphite (2.0) | 30 | 10 | 900 |
| Example |  |  |  |  |
| 8-1 | Na ethyl P-octane-phosphonate (0.5) | 105 | 5 | 1500 |
| 8-2 | K p-t-butylphenyl-P-dodecane-phosphonate (0.8) | 90 | 5 | 1400 |
| 8-3 | Ni di(cyclohexyl-P-octane-phosphonate) (1.2) | 105 | 10 | 1800 |
| 8-4 | Ni tridecanephosphonite (1:1) (.6) | 105 | 8 | 2000 |
| 8-5 | K octanephosphonate (2:1) (0.5) | 120 | 5 | 1600 |
| 8-6 | Li phenylmethane-phosphonate (2:1) (0.4) | 105 | 10 | 1500 |
| 8-7 | Na dodecane-phosphonate (2:1) (0.6) | 90 | 5 | 1400 |

The results show the much improved heat stability and excellent plate-out and weathering properties of the compositions stabilized according to this invention.

EXAMPLES 9-1 to 9-11

The performance tests shown in Table-10 were carried out in the same way as in Examples 4-1 to 4-11 with the following formulation containing organic phosphites together with a stabilizer composition of this invention. The phosphites used and the results are shown in Table-10.

| (Formulation) | Parts by weight |
|---|---|
| PVC (Geon 103EP) | 100 |
| DOP | 50 |
| Stearic acid | 0.3 |
| Zn-stearate | 0.5 |
| Ni tridecanephosphonate (1:1) | 0.7 |
| Epoxidized linseed oil | 1.0 |
| Organic phosphites | (Table 10) |

Table 10

| Example No. | Organic Phosphite Compounds | Amount | Heat Stability (180° C.) min | Initial* Color | Clarity* |
|---|---|---|---|---|---|
| 9-1 | none | — | 80 | good | good |
| 9-2 | monoisodecyl acid phosphite | 0.1 | 95 | very good | very good |
| 9-3 | diisodecyl acid phosphite | 0.1 | 100 | " | " |
| 9-4 | diphenyl acid phosphite | 0.2 | 105 | " | " |
| 9-5 | mono-2-ethylhexyldiphenyl phosphite | 0.5 | 110 | " | " |

Table 10-continued

| Example No. | Organic Phosphite Compounds | Amount | Heat Stability (180° C.) min | Initial* Color | Clarity* |
|---|---|---|---|---|---|
| 9-6 | ditridecyl phenyl phosphite | 0.5 | 120 | " | " |
| 9-7 | diisodecyl phenyl phosphite | 0.3 | 110 | " | " |
| 9-8 | tris(nonylphenyl) phosphite | 0.3 | 115 | " | " |
| 9-9 | tris(2,4-di-t-butylphenyl) phosphite | 0.3 | 120 | " | " |
| 9-10 | triphenyl phosphite | 0.5 | 105 | " | " |
| 9-11 | tridecyl diphenyl phosphite | 0.3 | 115 | " | " |

*compared to Control 7-1.

These results demonstrate the helpful synergism of stabilizer compositions of this invention with organic phosphites.

EXAMPLES 10-1 to 10-4

To observe the effects of stabilizer combinations of this invention on PVC-ABS polymer blend, a sheet was prepared and used to measure heat stability at 190° C., plate-out value and weatherability according to the following formulation.

The stabilizers used and the test results are shown in Table-11.

| (Formulation) | Parts by weight |
|---|---|
| PVC (Geon 103EP-8) | 100 |
| ABS (Blendex 111) | 10 |
| Epoxidized soybean oil | 3 |
| Ba-stearate | 0.8 |
| Tetra (C$_{12-15}$alkyl) bisphenol A . diphosphite | 1.5 |
| Stabilizers | 0.6 total |

Table 11

| No. | Stabilizers | Amount | Heat Stability (190° C.) min | Plate Out Value | Weather-ability hrs |
|---|---|---|---|---|---|
| Control | | | | | |
| 10-1 | Cd-stearate | 0.3 | | | |
| | ($\langle$phenyl$\rangle$—O—P(=O)(OH)—O)$_2$Pb | 0.3 | 90 | 50 | 700 |
| Example | | | | | |
| 10-1 | Cd di(ethyl P-octane-phosphonate) | 0.2 | | | |
| | Cd-stearate | 0.4 | 90 | 10 | 1500 |
| 10-2 | Sn di(P-nonylphenyl P alkane(C$_{12-15}$)phosphonate) | 0.3 | | | |
| | Pb-octoate | 0.3 | 90 | 5 | 1500 |
| 10-3 | Bu$_2$Sn octadecanephosphonate (1:1) | 0.3 | | | |
| | Zn-stearate | 0.3 | 90 | 6 | 1700 |
| 10-4 | Bu$_2$Sn di(benzyl P-tridecanephosphonate) | 0.4 | | | |
| | Zr P-tolylmethanephosphonate (1:2) | 0.2 | 105 | 5 | 1800 |

These results show that PVC-ABS polymer blends are greatly improved by stabilizer compositions of this invention.

We claim:

1. A stabilizer composition capable of enhancing the resistance to discoloration and loss of clarity of a vinyl chloride polymer when heated at 175° C., comprising (A) at least one metal salt of a monocarboxylic acid having 6 to 24 carbon atoms and free of sulfur and nitrogen, or a phenol having 6 to 30 carbon atoms and (B) at least one metal P-hydrocarbonphosphonate having linked directly to phosphorus one hydrocarbon group having 1 to 30 carbon atoms and three oxygen atoms of which at least one and not more than two are linked to metal.

2. A stabilizer composition according to claim 1 in which the metal carboxylic acid salt is a salt of the metals barium, calcium, cadmium, dialkyltin, magnesium, strontium, tin, or zinc.

3. A stabilizer composition according to claim 1 in which the salt is a salt of 2-ethylhexoic acid, neodecanoic acid, lauric acid, stearic acid, or nonylphenol.

4. A stabilizer composition according to claim 1 in which the metal P-hydrocarbonphosphonate has one P-hydrocarbonphosphonate group per metal atom.

5. A stabilizer composition according to claim 1 in which the metal P-hydrocarbonphosphonate has two P-hydrocarbonphosphonate groups per metal atom.

6. A stabilizer composition according to claim 1 in which the metal P-hydrocarbonphosphonate is a P-hydrocarbonphosphonate of barium, calcium, magnesium, stannous tin, strontium, or zinc.

7. A stabilizer composition according to claim 1 in which the metal P-hydrocarbonphosphonate is represented by the formula:

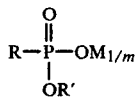

in which R is an aromatic group having 6 to 30 carbon atoms, an aliphatic group having 1 to 30 carbon atoms, or a cycloaliphatic group having 5 to 30 carbon atoms, M is a metal having a valence of m, R' is a group R or $M_{1/m}$, m is an integer from 1 to 4, and the metal is selected from Group I metals having an atomic weight less than 50, Group II metals having an atomic weight between 20 and 150, a metal of Group IV having an atomic weight between 90 and 220, and antimony, tin substituted with two alkyl groups having from 1 to 12 carbon atoms, and nickel.

8. A stabilizer composition according to claim 7 in which R' is an R group.

9. A stabilizer composition according to claim 8 in which R' is an aromatic group having from 6 to 30 carbon atoms.

10. A stabilizer composition according to claim 7 in which R' is $M_{1/m}$.

11. A stabilizer composition according to claim 7 in which m is 2.

12. A stabilizer composition according to claim 1 comprising as an additional ingredient a compound selected from the group consisting of 1,2-epoxides having 15 to 150 carbon atoms; hindered phenols; organic phosphites having 10 to 75 carbon atoms; esters of thiodialkylenedicarboxylic and 3-aminocrotonic acids; aliphatic polyhydric alcohols having 3 to 8 alcoholic hydroxyl groups; ketoacetic acid compounds having at least eight carbon atoms in the molecule; diphenyl thiourea; alkyl acid phosphates having 1 to 2 alkyl groups of 8 to 10 carbon atoms per phosphate ester group; ether alcohol acid phosphates having 1 to 2 ether alcohol groups per phosphate group, and betadiketones having two to three aromatic, cycloaliphatic, or aliphatic acyl groups linked to a single carbon atom.

13. A stabilized vinyl chloride polymer composition comprising a vinyl chloride polymer and a stabilizer composition according to claim 1.

14. A stabilized vinyl chloride polymer composition according to claim 13 in which the vinyl chloride polymer is homopolymer of vinyl chloride.

15. A stabilized vinyl chloride polymer composition according to claim 13 in which the vinyl chloride polymer is a copolymer of vinyl chloride and a co-monomer selected from the group consisting of propylene, ethylene, 1-butene, 1-hexene, vinyl acetate, acrylonitrile, and diethyl maleate.

* * * * *